United States Patent [19]

Sasa

[11] Patent Number: 4,807,939
[45] Date of Patent: Feb. 28, 1989

[54] JOINT STRUCTURE FOR AXLE

[75] Inventor: Naomichi Sasa, Fujisawa, Japan

[73] Assignee: Isuzu Motors Limited, Tokyo, Japan

[21] Appl. No.: 6,140

[22] Filed: Jan. 23, 1987

[30] Foreign Application Priority Data

Jan. 30, 1986 [JP] Japan .................................. 61-16690

[51] Int. Cl.⁴ ............................................. B60K 17/30
[52] U.S. Cl. ................................ 301/124 H; 180/259
[58] Field of Search ............... 301/124 R, 124 H, 125, 301/126, 130; 180/258, 259

[56] References Cited

U.S. PATENT DOCUMENTS

| 4,119,67 | 10/1978 | Yamada et al. | |
|---|---|---|---|
| 2,264,785 | 12/1941 | Ash | 180/259 X |
| 2,598,876 | 6/1952 | Ash | 180/259 X |
| 4,337,953 | 7/1982 | Ikeda et al. | 301/124 H X |

FOREIGN PATENT DOCUMENTS

| 2931764 | 2/1981 | Fed. Rep. of Germany . |
|---|---|---|
| 56-24226 | 3/1981 | Japan . |
| 59-37386 | 10/1984 | Japan . |
| 59-37387 | 10/1984 | Japan . |

Primary Examiner—James B. Marbert
Attorney, Agent, or Firm—Browdy and Neimark

[57] ABSTRACT

A joint structure for an axle housing ball-end, in which the mounting surface of a knuckle mounted on an axle casing is inclined at a predetermined angle with respect to the horizontal axis of an axle, for example, about 4°, the position of a seal mounted on the knuckle being inclined at a predetermined angle with respect to a spherical portion of the respective ends of the axle housing, and each end of an axle shaft disposed in the spherical portion of each of the axle housing ends forming the outer race of a constant-velocity joint.

3 Claims, 6 Drawing Sheets

FIG. 1B
FIG. 1A
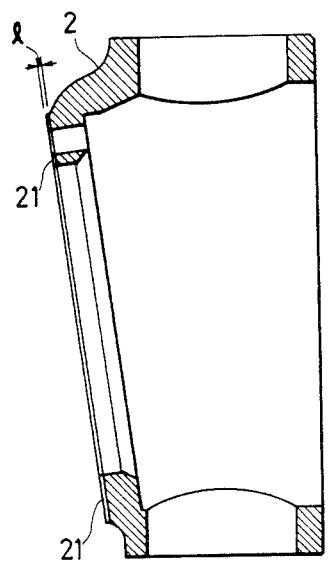
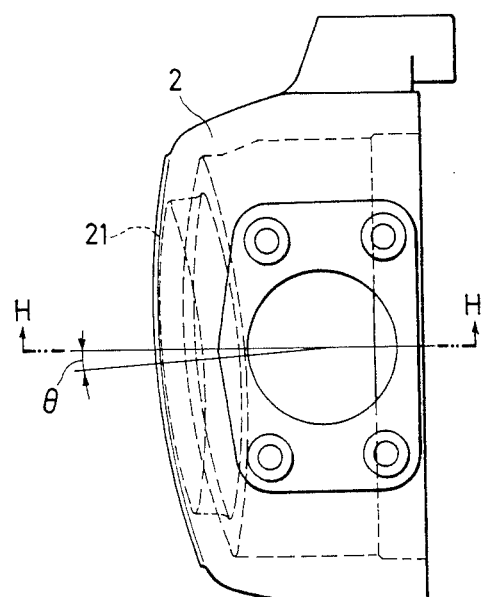
FIG. 1C
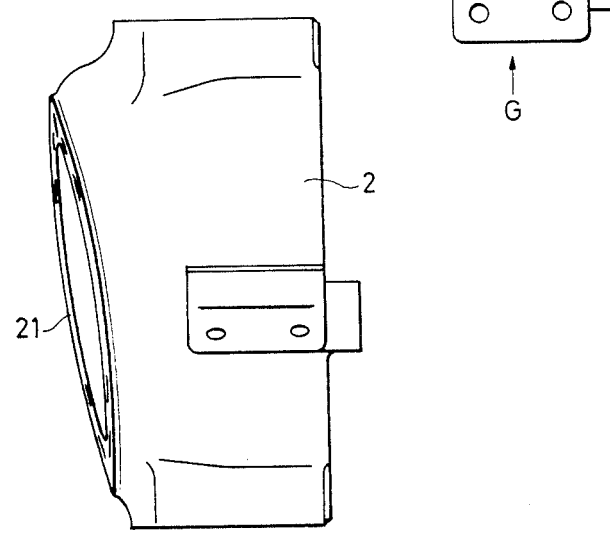

JOINT STRUCTURE FOR AXLE

BACKGROUND OF THE INVENTION

1. Field of the Invention

The present invention relates generally to a joint structure for each ball-end of an axle housing, and more particularly to a joint structure at each ball-end of an axle housing for a driving axle with a steering device.

2. Description of the Prior Art

A typical driving axle with a rigid type steering device used in an all wheel drive type vehicle has heretofore included a spherical portion equipped with a dust-tight seal so as to prevent foreign matter from entering the interior of each joint. This type of joint structure for an axle housing ball-end is disclosed, for example, in the specification of Japanese Patent Laid-Open No. 24226/1981. A follower steering shaft of the type disclosed in the above-mentioned specification will be hereinafter described with reference to FIG. 7.

Referring to FIG. 7, the follower steering shaft is essentially constituted by three components which can be separated from one another: a shank 71 coupled to a differential unit; a constant-velocity joint 72; and a steering shaft 74 for driving a boss or a sun gear (not shown) within a planetary unit. The constant-velocity joint 72 includes a spherical external coupling member 75 mounted on one end of the shank 71 and an internal coupling member 77 mounted on a corresponding end of the steering shaft 74. A bellows 73 hermetically seals the inner chamber of the constant-velocity joint 72, the bellows being detachably mounted on the external coupling member 75 of the constant-velocity joint 72, and a neck 76 of the bellows 73 being maintained in airtight contact with the steering shaft 74 for free movement along the axis thereof. The bellows 73 has an axial residual stress, and is therefore formed strongly enough to be extended to its maximum axial length. The constant-velocity joint 72 equipped with the bellows 73 can be removed without the need to release it.

In general, a conventional type arrangement has difficulties in ideally disposing the seal on the spherical portion of each of the axle housing ends since the ends of king-pins, that is, dust-tight seals are hindrances. The spherical portion at the axle housing ball-end housing the driving axle therein forms a member for supporting a load as a portion of an axle casing. For this reason, the conventional configuration of a rotary body housing an axle shaft which is worked by means of a lathe does not allow for any reduction in the diameter of the neck from the viewpoints of strength, so that a seal sliding surface necessary for satisfactory steering cannot be ensured and the maximum steering angle possible is therefore restrained up to about 30°. However, since the internal structure of each joint and associated components are actually arranged to allow the maximum steering angle of about 40°, a demand has arisen with respect to a seal having a steering-angle function to be matched with such structure.

For the above-described reason, the prior art discloses an elliptic-seal structure in which a surface of each knuckle on which a seal is mounted is inclined with respect to the spherical portion of an associated axle housing end. This type of structure is disclosed, for example, in the specifications of Japanese Utility Model Publication Nos. 37386/1984 and 37387/1984.

First of all, a diagrammatic description will be made with respect to a front-wheel support device for a front drive vehicle described in Japanese Utility Model Publication No. 37386/1984. Either an oil seal member or an oil seal protection member is so formed as to have an axial length greater on the rear side than on the front side in the direction of movement of the vehicle when a knuckle housing is mounted. The seal of this prior art is disposed around a king-pin for pivoting the knuckle housing and a trunnion socket in an inclined manner at a predetermined angle, so that, when a vehicle is moved straight, a flat surface including the seal edge of either the oil seal member or the oil seal protection member is disposed closer to the shaft of the trunnion socket on the front side than on the rear side. In this front-wheel support device for a front drive vehicle, the seal is formed in a special shape so as to increase the steering angle. However, even if the seal is formed in such a special shape, it is not necessarily satisfactory in respect of its strength, sealing characteristics and durability. In addition, this type of seal is difficult to produce and of no practical use, thus leading to various problems.

In the second place, a diagrammatic description will be made with respect to an oil seal device for a front-wheel support of a front drive vehicle described in the specification of Japanese Utility Model Publication No. 37387/1984. Referring to an oil seal member in this prior art, a rubber-made seal body has an equal width along its entire circumference in a natural state, and a circumferential groove of a L-shaped in section is formed from a mounting flange of the seal body to an arm portion perpendicular to the mounting flange. A reinforced flange member of a metal-made cylindrical flange body has a cut surface on the cylindrical side, such cut surface being inclined with respect to a flange surface, and is adherently engaged with the circumferential groove in a state wherein this groove is under an elastic tension. The reinforced flange member is also disposed around a king-pin for pivoting the knuckle housing and the trunnion socket in an inclined manner at a predetermined angle, so that, when a vehicle is moved straight, a flat surface including the edge of the annular seal is positioned nearer the trunnion socket on the front side than on the rear side. As in the case of the above-described example, this oil seal device for the front-wheel support of a front drive vehicle needs a seal with a special shape, and thus there is a problem in that the seal provided may not necessarily be satisfactory from the viewpoint of strength, sealing characteristics and durability, nor with respect to considerations regarding the production of the seal.

SUMMARY OF THE INVENTION

It is an object of the present invention to provide a joint structure for an axle housing ball-end, which solves the above-described problems and increase the steering angle of each joint portion on the spherical portion of the respective axle housing ends, that is, the inflective angle.

It is another object of the present invention to provide a joint structure for an axle housing ball-end capable of improving the steerability of a vehicle when it makes sharp turns, and yet of ensuring the strength of the entire axle.

It is another object of the present invention to provide a joint structure for an axle housing ball-end, in which the mounting surface of a knuckle mounted on an axle casing is inclined at a predetermined angle with respect to the horizontal axis of the axle, for example, about 4°.

It is another object of the present invention to provide a joint structure for an axle housing ball-end, in which the position of a seal mounted on the knuckle is inclined at a predetermined angle with respect to the spherical portion of the axle housing ball-end.

It is a further object of the present invention to provide a joint structure for an axle housing ball-end, in which the seal mounted on the knuckle need not be formed into a special shape, and yet which suffers no problems from the viewpoint of the strength, sealing characteristics and durability of the seal, nor with respect to the production of the same.

It is a still further object of the present invention to provide a joint structure for an axle housing ball-end, in which the seal mounted on the knuckle can be moved freely over the spherical surface without being hindered by the axle housing ball-end, so that the steering angle can be increased.

It is another object of the present invention to provide a joint structure for an axle housing ball-end, in which, since the seal mounted on the knuckle is substantially free from any tendency to interferency with the operation of the axle shaft and the axle housing ball-end, the steering angles of the wheels can be increased, thus permitting a reduction in the turning radius of a vehicle and improvements in the steerability thereof when making sharp turns.

It is another object of the present invention to provide a joint structure for an axle housing end in which, in contrast to the prior art, while a vehicle is moving straight forward, the seal approaches the boundary between the axle housing ball-end and the spherical portion, that is, the position of the neck, toward the front side of the vehicle more than it does toward the rear side thereof, so that the distance necessary for it to come into contact with the neck at the rear position is increased, thereby increasing the steering angle and reducing the turning radius of a vehicle.

It is yet another object of the present invention to provide a joint structure for an axle housing ball-end, in which the assembly of a dust guard seal for the axle housing ball-end is easy, and the water tightness of the seal is remarkably improved, so that, if a particular small member outside the axle housing shaft is used as a mechanical safety device for torque, it is possible to prevent damage or breakage of other devices and parts.

BRIEF DESCRIPTION OF THE DRAWINGS

FIG. 1A is a top plan view diagrammatically showing a knuckle mounted on an axle casing in a joint structure for an axle housing ball-end of a drive axle with a steering device in accordance with the present invention;

FIG. 1B is a cross-sectional view taken along line H—H of FIG. 1A;

FIG. 1C is a front elevational view taken in the direction of an arrow G of FIG. 1A;

DETAILED DESCRIPTION OF PREFERRED EMBODIMENTS

Preferred embodiments of a joint structure for an axle housing ball-end of a driving axle with a steering device in accordance with the present invention will be described below with reference to the accompanying drawings.

Referring to FIGS. 1A, 1B and 1C respectively showing a first preferred embodiment of a joint structure for an axle housing ball-end in accordance with the present invention, a knuckle 2 mounted on an axle casing 20 (refer to FIG. 2) is schematically illustrated. FIG. 1A is a top plan view of the knuckle 2, in which a mounting surface 21 of the knuckle 2 mounted on the axle casing 20 is inclined at a predetermined angle $\theta$, for example, about 4° with respect to the axis of an axle, that is, the horizontal axis of the axle casing 20. FIG. 1B shows the mounting surface 21 of the knuckle 2 which is inclined at the predetermined angle $\theta$, for example, about 4° with respect to the axis of the axle casing 20, and therefore is biased by a distance l, for example, a distance of about 2 mm. FIG. 1C shows the mounting surface 21 of the knuckle 2 which is inclined at the predetermined angle $\theta$.

Figure 2:
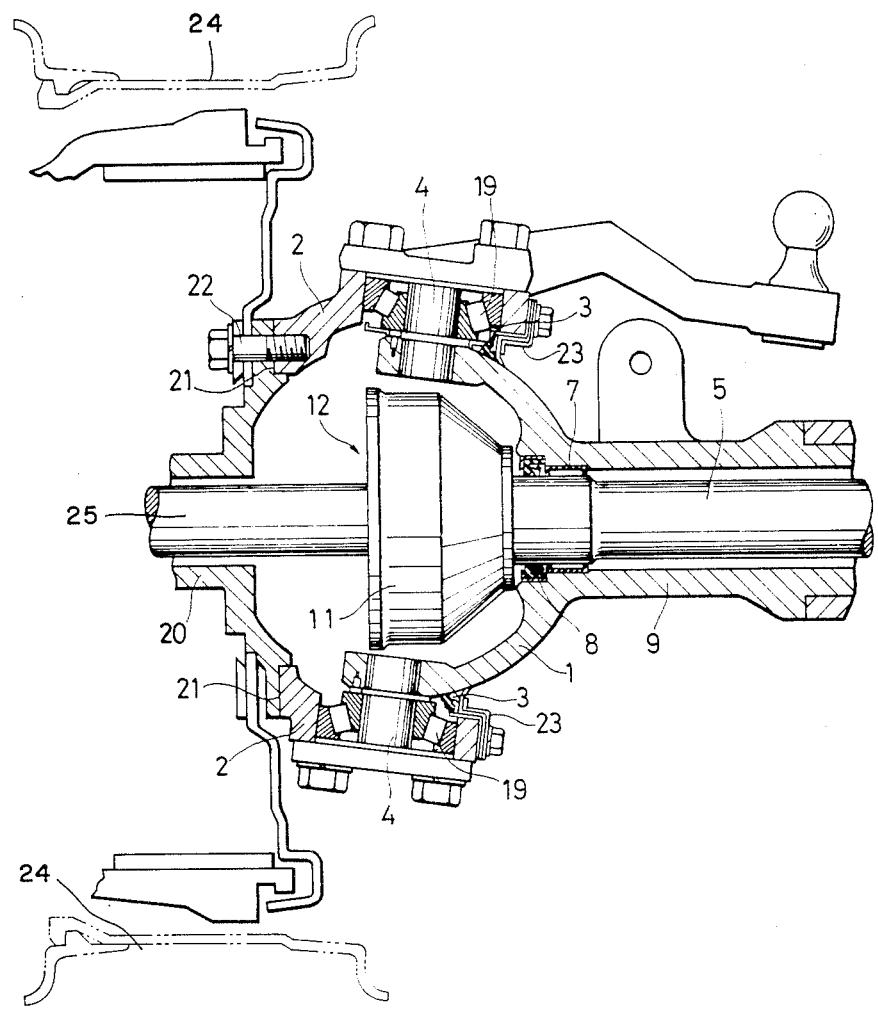
FIG. 2 is a partial sectional view of a preferred embodiment of a joint structure for an axle housing ball-end of a driving axle with a steering device in accordance with the present invention.

FIG. 2 shows the first preferred embodiment of a joint structure for an axle housing ball-end of a driving axle with a steering device in accordance with the present invention, more specifically a joint structure for an axle housing ball-end incorporating the knuckle 2 shown in FIG. 1A. This joint structure has a spherical portion 1, and a seal 3 is provided in order to prevent foreign matter from entering the inner chamber of the joint structure. The annular seal 3 made of rubber, felt or the like is mounted on the knuckle 2 in contact with the spherical portion 1 of an axle housing end 9. The seal 3 is disposed on the spherical portion 1 next to king-pin bearings 19 of a pair of upper and lower king-pins 4. While the knuckle 2 is swinging about the axis connecting the king-pins 4, the seal 3 can perform its sealing function as it hermetically slides on the spherical portion 1. The knuckle 2 is fixed to the axle casing 20 by a bolt 22. It should be understood that the mounting surface 21 of the knuckle 2 mounted on the axle casing 20 is horizontally inclined at the predetermined angle $\theta$, for example, about 4° with respect to the axis of the axle, that is, the axis of the axle casing 20. Accordingly, the axis of the knuckle 2 is horizontally inclined at the predetermined angle $\theta$, for example, about 4° with respect to the axis of the axle casing 20. Therefore, the knuckle 2 and the axle housing end 9 are inclined at a predetermined angle in such a manner that, while a vehicle is moving straight forward, the annular portion of the seal 3 and a seal protecting member 23 approaches the axle housing end 9, that is, the boundary between the axle housing end 9 and the spherical portion 1 toward the front side of a vehicle more than it does toward the rear side thereof.

Figure 3A:
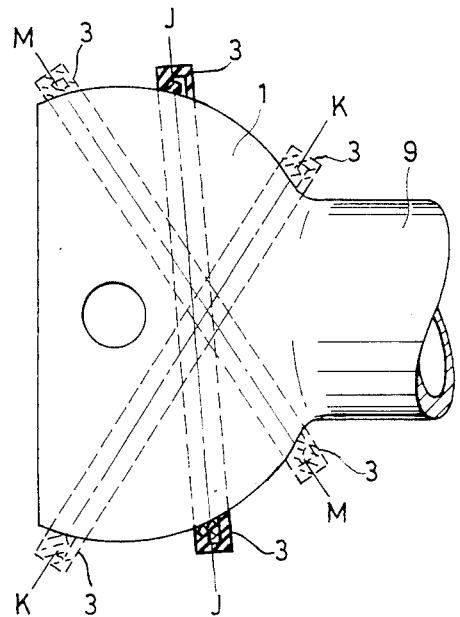
FIG. 3A is an illustration diagrammatically showing the relationship between the spherical surface of the axle housing ball-end and the seal for the knuckle in the joint structure for an axle housing ball-end in accordance with the present invention.
Figure 3B:
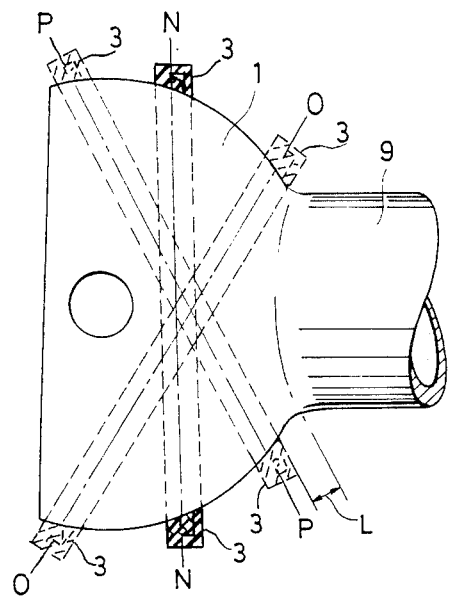
FIG. 3B is an illustration diagrammatically showing the relationship between the spherical surface of the axle housing ball-end and the seal for the knuckle in the joint structure for an axle housing end in accordance with the prior art.

A mounting structure in which the seal 3 is inclined with respect to the spherical portion 1 will be described below with reference to FIGS. 3A and 3B. In FIGS. 3A and 3B, the spherical portion 1 is integral with the axle housing end 9, and the seal 3 is secured to the knuckle 2.

FIG. 3B shows an example in which an angle at which the seal 3 is mounted is not inclined as in the case of the prior art, that is, the predetermined angle $\theta$ is 0°, with the seal 3 corresponding to positions N, O and P. The position N of the seal 3 corresponds to a steering angle of 0°, the position O of the seal 3 corresponding to the maximum steering angle of a wheel on the inner side of a curve, that is, a case wherein the maximum steering angle of the wheel on the inner side is 34°, and the position P of the seal 3 corresponding to the maximum steering angle of a wheel on the outer side of the curve, that is, a case where the maximum steering angle of the wheel on the outer side is 27°. If the seal mounting angle is 0° in this manner, when the seal 3 is mounted, the spherical portion 1 cannot be utilized from end to end, that is, it is impossible completely to utilize the entire range continuing to a position at which the seal 3 comes into contact with the axle housing end 9. Accordingly, although there is a margin equivalent to a length indicated by symbol L on the spherical portion 1, the marging cannot be covered.

FIG. 3A shows an embodiment to which the joint structure for an axle housing ball-end in accordance with the present invention is applied, in which the mounting angle of the seal 3, that is, the predetermined angle $\theta$ is, for example, about 4°, with the seal 3 being located at positions J, K and M. The position J of the seal 3 corresponds to a steering angle of 0°, the position K of the seal 3 corresponding to the maximum steering angle of the wheel on the inner side, that is, a steering angle of 38°, and the position M of the seal 3 corresponding to the maximum steering angle of the wheel on the outer side, that is, a steering angle of 30°. When the seal 3 is mounted, if the seal mounting angle is inclined at about 4°, the slide distance of the seal 3 on the side of the steered wheel on the inner side can be enlarged effectively to utilize the whole of the spherical portion 1.

If the seal 3 is set at a position corresponding to the substantial maximum diameter of the spherical portion 1 of the axle housing end 9, it can, during assembly, be removed from the spherical portion 1 solely by virtue of the flexibility inherent in seal rubber. Therefore, unlike a conventional type of structure, it is unnecessary partially to cut the seal 3 and a retainer prior to such removal. In general, a slit formed in a partially cut configuration might cause the deterioration of sealing characteristics of the seal.

The axle shaft 5 is supported by a bearing 7. An oil seal 8 which is radially tightened by a lip is capable of hermetically sealing a rotating or reciprocally movable portion, thus preventing differential-gear lubricating oil from entering the inner chamber of the joint. Since the interference between the spherical portion of the axle housing end 9 and the knuckle 2 confines the length of a portion extending from the respective king-pins 4 to the exterior, the portion of the axle shaft 5 which might interfet with the axle housing end 9 preferably has a structure as thin as possible in order to ensure a satisfactory area in which the seal 3 can be slided. Since the thinnest portion of the axle shaft 5 is used as an interference portion, it is effective in terms of the structure of the axle shaft 5 that the axle shaft 5 is disposed in a direction opposite to that of a normal structure, that is, an outer race 11 of a constant-velocity joint 12 is mounted on one end of the axle shaft 5. For example, if the thinnest portion of the axle shaft 5 is formed in such a manner that it is twisted off at the time of application of an excessive power input, it is possible to effectively protect other expensive devices and components.

Figure 5A:
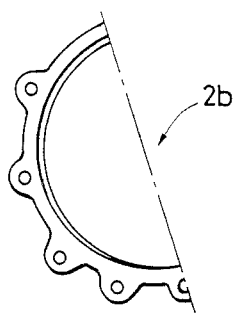
FIG. 5A is a perspective view diagrammatically showing a lower knuckle member of the knuckle in accordance with the present invention.
Figure 5B:
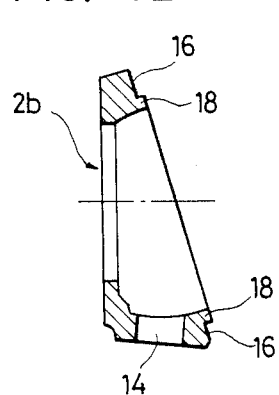
FIG. 5B is a cross-sectional view of the knuckle member shown in FIG. 5A.
Figure 6:
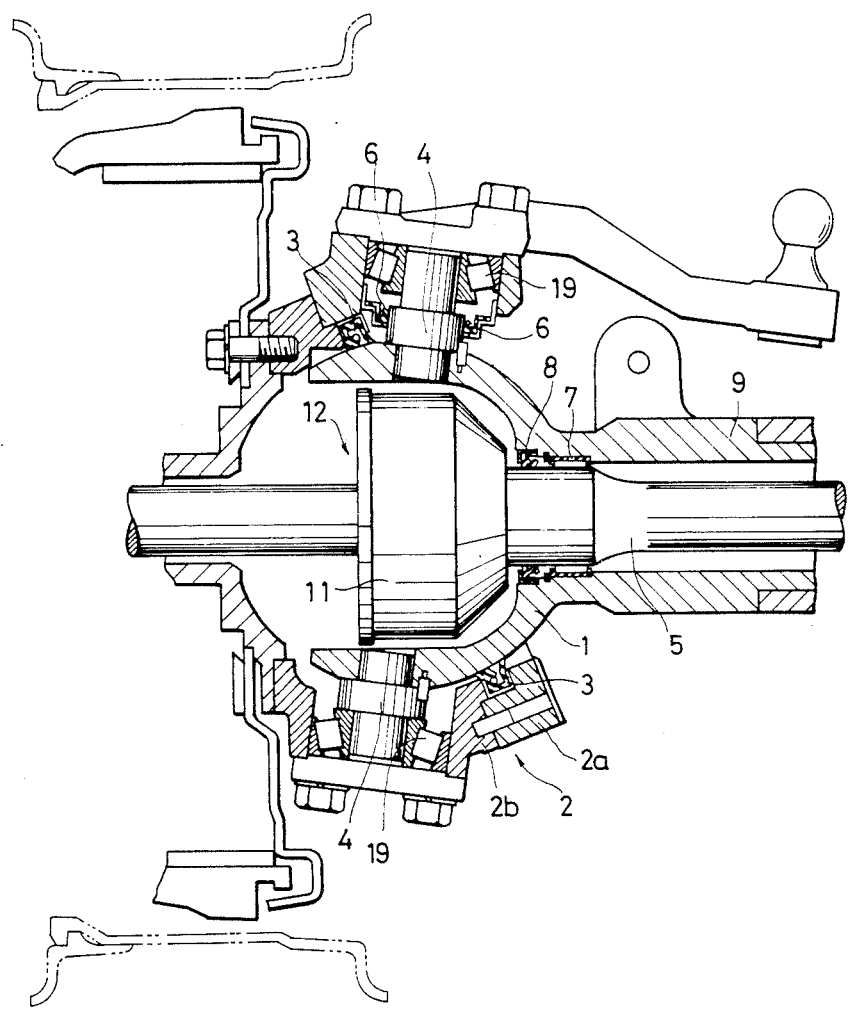
FIG. 6 is a partial cross-sectional view similar to FIG. 1, but showing another preferred embodiment of a joint structure for an axle housing ball-end of a driving axle with a steering device in accordance with the present invention.
Figure 7:
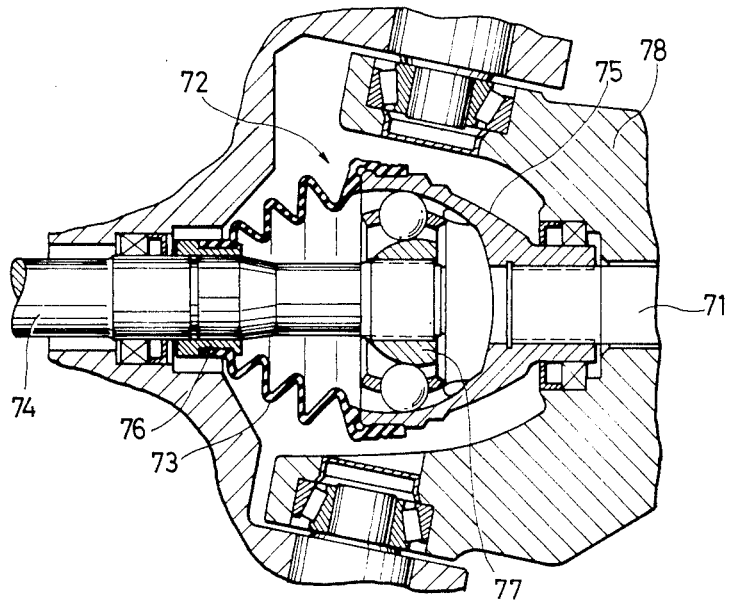
FIG. 7 is a cross-sectional view similar to FIG. 6, but showing the joint structure for an axle housing ball-end of the prior art.

In addition, in order to effectively utilize the area of the surface of the spherical surface 1 on which the seal 3 slides, it is preferable that the seal 3 is located at the middle position of the slide surface while a vehicle is moving straight forward. For this reason, in order to ideally dispose the seal 3 while it has a shape easy to produce and a true circle enabling positive performance of its function, it is preferable that the seal 3 is disposed at an ideal position corresponding to each of upper and lower substantial middle portions by taking notice of the fact that the upper and lower portions of the seal 3 is not substantially moved even while the knuckle 2 is swinging. For example, as shown in FIG. 6, the seal 3 may be arranged to obliquely cross the axis connecting the upper and lower king-pins 4. This arrangement will be described below with reference to FIGS. 4A, 4B, 5A, 5B and 6.

Referring to FIG. 6 showing a structure in which the seal 3 is secured at the aforementioned location as described above, the knuckle 2 is constituted by upper and lower divisions: knuckle members 2a and 2b. The seal 3 is sandwiched between the knuckle members 2a and 2b, whereby the seal 3 may be firmly mounted.

FIGS. 4A, 4B, 5A and 5B shows the details of the structure in which the knuckle 2 is divided into the knuckle members 2a and 2b.

Figure 4A:
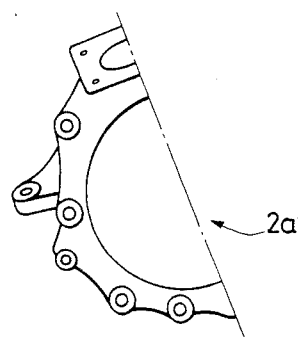
FIG. 4A is a perspective view diagrammatically showing an upper knuckle member of the knuckle in accordance with the present invention.
Figure 4B:
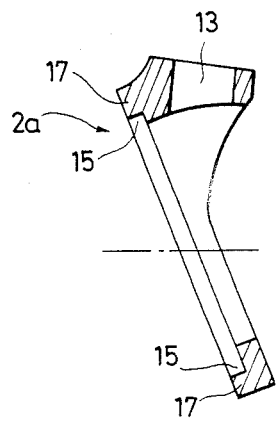
FIG. 4B is a cross-sectional view of the knuckle member shown in FIG. 4A.

FIG. 4A is a perspective view of the knuckle member 2a, that is, the knuckle member including an upper king-pin hole 13, with FIG. 4B being a cross-sectional view of the member 2a shown in FIG. 4A. FIG. 5A is a perspective view of the knuckle member 2b, that is, the lower knuckle member, with FIG. 5B being a cross-sectional view of the member 2b shown in FIG. 5A. The upper king-pin hole 13 in the knuckle member 2a may be machined together with a king-pin hole 14 in the knuckle member 2b. An cutout step 15 of the knuckle member 2a is engaged with a projection 18 of the knuckle member 2b while a projection 17 of the knuckle member 2a is engaged with a cutout step 16 of the knuckle member 2b. The depth of the cutout step 15 differs from the height of the projection 18, and thus a clearance is formed therebetween for firmly clamping the seal 3. By mounting the seal 3 on the knuckle 2 in this manner, the seal 3 is disposed obliquely to cross the axis connecting king-pin bearings 19 mounted around the king-pins 4. Therefore, since either of the upper and lower king-pins 4 is exposed to the outside of the seal 3, a king-pin seal 6 is disposed around the exposed king-pin bearing 19.

The embodiment of the joint structure for an axle housing ball-end in accordance with the present invention is constructed as described above. However, it will be readily understood by those skilled in the art that this invention is not confined solely to the structure described above in detail. For example, the following structure may be applied.

Even in a conventional structure, if an axle shaft is reversed such that the front side of the seal mounting surface is inclined inwardly of a vehicle with the rear side outwardly of the same, the difference between the steering angles of the wheels on the inner and outer sides in the Ackerman steering mechanism is suitably distributed between the areas of the seal slide surfaces corresponding to the respective wheels, thereby increasing the steering angle of the wheel on the inner side, so that the turning radius of the vehicle can be reduced.

Referring to a method of inclining the seal mounting surface, the inclination of the surface of a knuckle to be worked provides the advantage that it is unnecessary to prepare a seal of a special shape. The structure of this invention has the potential of achieving of the steering angles 40°, 40° of wheels by disposing the seal in an obliquely crossed manner with respect to the axis connecting the king-pins. Therefore, where a difference is to be formed between the steering angles of the wheels on the inner and outer sides in the Ackerman steering mechanism, a caster angle equivalent to half the difference is formed, and in addition each terminal end of the axle housing is inclined by half of the angle difference in order to prevent the occurence of unwanted interference. By these measures, as an example, it is possible to obtain large steering angles such as 45° and 35°. As a matter of course, although the built-in constant-velocity joints need ability responsive to these steering angles, constant-velocity joints generally have such ability as a part of their own functions.

What is claimed is:

1. A joint structure for an axle for a driving axle equipped with steering means, comprising:

non-rotatable tubular axles each extending in the transverse direction of a car;

spherical portions each having a spherical surface formed at the end portion of said tubular axle;

non-rotatable hollow axle casings each disposed on a wheel with respect to said tubular axle;

first and second knuckles each mounted to said axle casing and supporting rotatably by a pair of king pins fitted to said spherical portions;

annular seals each fitted to said knuckles and coming into sliding contact with said spherical surface of said spherical portions; and constant-velocity joints each connecting an axle shaft supported rotatably in said tubular axle to a drive shaft disposed rotatably inside said axle casing, and disposed inside the space defined by the spherical portion, the knuckle and said axle casing;

wherein the outer race of said constant-velocity joint is coupled to the end of said axle shaft;

said axle casing has an annular end surface crossing substantially orthogonally the axis of said axle casing;

said knuckles have an annular end surface inclined by a predetermined angle from a surface orthogonal to the axis of said knuckles;

and when said annular end surface of said axle casing and said annular end surface of said knuckles are fitted in a contacting state, the axis of said first and second knuckles cross each other at the back of the axis of said tubular axle.

2. A joint structure for an axle according to claim 1, wherein said predetermined angle is about 4°.

3. A joint structure for an axle according to claim 1, wherein said annular seal is mounted on one end of said knuckle.

* * * * *